United States Patent
Li et al.

(10) Patent No.: US 9,419,884 B1
(45) Date of Patent: Aug. 16, 2016

(54) INTELLIGENT AUTOMATED TESTING METHOD FOR RESTFUL WEB SERVICES

(71) Applicants: Ye Li, Beijing (CN); Ning Fu, Beijing (CN); Bin Wang, Beijing (CN); Xiaoming Gao, Beijing (CN)

(72) Inventors: Ye Li, Beijing (CN); Ning Fu, Beijing (CN); Bin Wang, Beijing (CN); Xiaoming Gao, Beijing (CN)

(73) Assignee: EMC Corporation, Hopkinton, MA (US)

( * ) Notice: Subject to any disclaimer, the term of this patent is extended or adjusted under 35 U.S.C. 154(b) by 596 days.

(21) Appl. No.: 13/730,261

(22) Filed: Dec. 28, 2012

(51) Int. Cl.
*H04L 12/26* (2006.01)
*H04L 29/06* (2006.01)

(52) U.S. Cl.
CPC ............. *H04L 43/50* (2013.01); *H04L 12/2697* (2013.01); *H04L 63/12* (2013.01)

(58) Field of Classification Search
CPC combination set(s) only.
See application file for complete search history.

(56) References Cited

U.S. PATENT DOCUMENTS

| | | | |
|---|---|---|---|
| 8,745,641 B1 * | 6/2014 | Coker | 719/328 |
| 2010/0131928 A1 * | 5/2010 | Parthasarathy et al. | 717/126 |
| 2011/0264961 A1 * | 10/2011 | Hong | 714/38.1 |
| 2014/0075242 A1 * | 3/2014 | Dolinina et al. | 714/27 |

OTHER PUBLICATIONS

"Javascript Tutorial". javascript.info. Dec. 3, 2011. http://web.archive.org/web/20111203171824/http://javascript.info/tutorial/objects.*

* cited by examiner

*Primary Examiner* — Chris Parry
*Assistant Examiner* — Caroline Jahnige
(74) *Attorney, Agent, or Firm* — Barry N. Young

(57) ABSTRACT

A generalized testing framework for testing a RESTful web service defines test cases that described RESTful operations on resource object and associated data in configuration files generates HTTP requests to the web service based upon a test case and receives corresponding responses, creates expected responses, and filters fields of interest from the actual and expected responses, and compares the filtered responses to determine whether they match. Expected responses are automatically created during runtime by mapping input data and RESTful API operations to a resource object based upon the test case, avoiding the necessity of predicting responses in advance. Test cases may be readily changed or adapted to different Restful web services by changing configuration files.

20 Claims, 2 Drawing Sheets

INTELLIGENT AUTOMATED TESTING METHOD FOR RESTFUL WEB SERVICES

BACKGROUND

This invention relates generally to testing frameworks for software products such as web services, and more particularly to a flexible generalized testing framework for testing different web service functionality.

Proper testing of products such as web services to verify functionality requires the generation of many different test cases with appropriate input parameters and expected responses that can be compared to actual responses. To test a web service, for example, testers must send out a large number of different HTTP requests, receive responses, and compare the actual received responses with the expected response for each request. Each test case generally must be defined in a programming language with a set of input parameters to cause an HTTP client to send out a request that invokes a desired response. Testing of web service software products using traditional testing approaches generally requires hard coding of expected results into each test assertion. This makes revising test cases, composing new test cases or applying a given test case to a new system under test a complex, time consuming and labor intensive task. Frequently, predicting expected results is difficult or impossible. Since most expected values in responses are dependent upon the input parameters sent with the request, generating expected responses typically requires a mapping of input parameters and operations to test responses. This effectively hard codes test cases, requiring them to be redone to change the test cases. For many operations, values assigned by the system under test while processing a test case cannot be predicted. Thus, although there are testing frameworks available that enable one to create large numbers of test cases, their utility is limited. They are generally unable to provide expected results for each test case. As a result, a testing framework must be hard coded and static, and specific to a particular software product. Any change in the product requires a change in the testing framework. This makes a general testing framework for web service products infeasible since expected responses depend upon many variables, some of which may be unpredictable or unknown in advance of runtime. Accordingly, designing testing frameworks even for products having limited functionality is a difficult and a complex task.

Testing using general purpose simulators to simulate expected responses of software products to a plurality of general test cases is also generally infeasible for the same reasons discussed above. Furthermore, simulators tend to be complex, must be designed and constructed for particular test cases, and cannot be changed easily. Accordingly, they lack flexibility and are not useful for testing the full range of functionality of most web service products.

It is desirable to provide a general testing framework for web services that addresses the foregoing and other problems of know testing frameworks, and it is to these ends that the present invention is directed.

DESCRIPTION OF PREFERRED EMBODIMENTS

The invention is particularly well adapted to testing products such as web services based upon the REST architecture, and will be described in that context. As will become evident, however, this is illustrative of only one utility of the invention, and the invention may find applicability with other types of products having a REST or other architectures.

The well-known Representational State Transfer (REST) architecture is an architectural style for network software products such as distributed hypermedia client-server systems that utilize technologies and protocols of the World Wide Web. REST describes how distributed data objects (resources) are defined, addressed and transferred over HTTP. RESTful web services based upon the REST architecture are a simpler alternative to standard SOAP and WSDL based interfaces. The REST architecture advantageously provides a uniform interface between components, and requests from a client to a server contain all the information necessary to understand the request without the necessity for access to any stored context on the server or prior requests. REST supports only four types of operations: POST (create), GET (read or retrieve a resource), PUT (update a resource), and DELETE (delete a resource). REST uses HTTP methods explicitly, and establishes a mapping between the four supported operations and HTTP methods. RESTful web services are a simplified way of publishing information and making processes available to others so they may interact with the information. REST permits a standard web browser to access any application or data resource. As such, REST is widely used for web services, and is the type of architecture with which the intelligent automated testing framework of the invention may be used.

Figure 1:
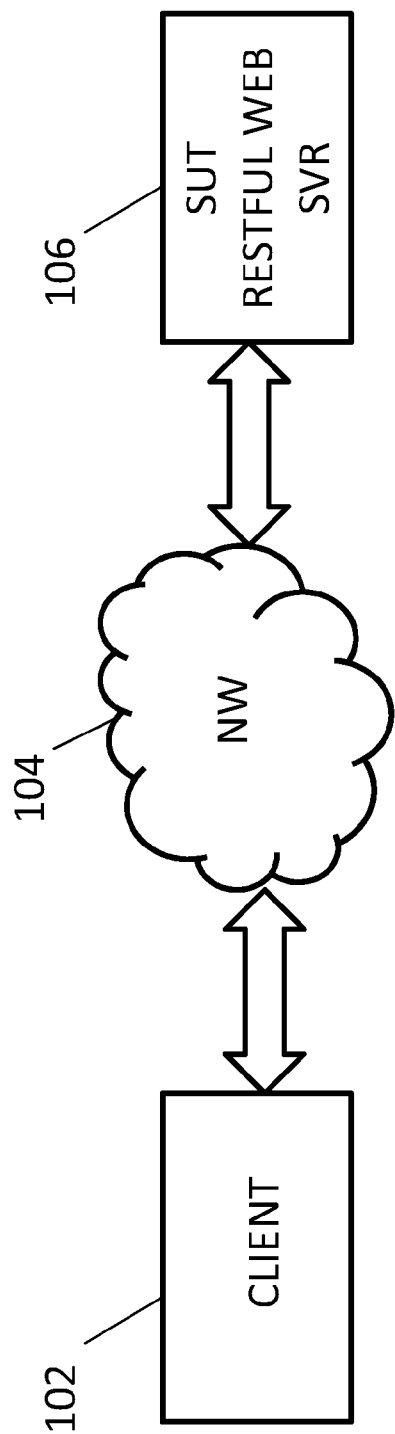
FIG. 1 is a diagrammatic view of a client-server web service environment of the type with which the invention may be employed.

FIG. 1 illustrates a client-server RESTful web service environment of the type with which the testing framework invention may be employed. One or more clients 102 may be interfaced via a network such as the World Wide Web 104 to a server system under test (SUT) comprising a RESTful web service 106. Client 102 may comprise a conventional computer system comprising standard components (not illustrated) such as a CPU, input/out devices, memory, a network interface and non-transitory physical computer readable media embodying executable instructions for controlling the operation of the CPU. The computer readable media may embody an HTTP client program to enable the client to communicate with the web service 106. In a well known way, client 102 may send HTTP requests architected using REST principles to the RESTful web service 106, and receive HTTP responses to the requests from the RESTful web service via the web 104. The RESTful web service may also comprise a computer system having control programs that afford a web service that includes RESTful APIs designed in accordance with REST principles as a resource oriented model in which every resource is represented as a collection. Each RESTful API corresponds to an operation applied to a set of resource objects, and a RESTful response API represents either the status of an operation or detailed information about the response object. As will be described, Web Application Description Language (WADL) files are preferably used to describe APIs. Client 102 may function as a tester, and embody a testing framework for testing the RESTful web service 106. In order to test the RESTful web service, the tester (client 102) needs to send a plurality of HTTP requests to the web service, receive responses from the web service, and compare the actual received responses with expected responses to determine whether they match. In previously known testing frameworks this required an operator to generate each test case in a programming language, generate corresponding expected responses, and to indicate the expected values for the response based upon input parameters. As previously described, this was complex, labor intensive and time-consuming, and made it difficult to change tests readily or to adapt a test case constructed for one web service to a different web service.

As will be described, an intelligent testing framework in accordance with the invention avoids these difficulties by providing a generalized RESTful testing framework on client 102 that enables a test configuration to be easily changed by changing configuration files and that automatically generates expected responses for a test case at run time based upon operations and input data. This enables test cases that previously were infeasible because of the difficulty on impossibility of predicting responses, avoids the burden of manually generating expected response details in advance, and permits changes to be easily made to a test case or for different services under test.

The testing framework in accordance with the invention is a generalized one. As will be described, it affords agile test case authoring, and centralized assertion logic to enable functional changes of a RESTful web service to be readily handled by simply changing mapping and assertion rules instead of changing test scripts. It separates test scenarios from expected results by providing configuration files that describe test cases and their input data and the mappings of APIs to test parameters. More importantly, however, it automatically generates expected results for each test case at run time while the test case is processing. These result in a generalized testing framework in which test cases are easily changed. Moreover, the testing framework preferably uses Web Application Definition Language (WADL) or similar text based languages to define operating process APIs and test cases. WADL may be used to describe the URL, HTTP METHOD, and parameters of each HTTP request. In addition to enabling test cases to be easily authored and changed, the testing framework enable testers to use alias reference identifications (ids) as substitutes for the real ids, of resource objects, for instance. Since a resource object's real id is randomly assigned during run time, its value is not known in advance and is unpredictable. Since the resource object's real id will be used in URL or query/form parameters, this requires a testing framework that can either determine or generate real ids during testing in order to generate an expected response. Once real ids are created during processing, they may be recorded in a local database in the client and mapped to corresponding alias ids at run time. This enables generalized test cases to be created and automatically updated at run time with the appropriate real parameters as they are used.

As previously described, a RESTful web service supports only four types of operations. Each RESTful API can be considered an operation in which any of the four types of operations may be applied to a set of resource objects. The response of the RESTful API represents either the status of an operation or provides detailed information about a resource object. The APIs are preferably defined as WADL files, as previously described. This is advantageous in that even though the URL or operation type of an API is changed, it is unnecessary to change the test cases. It is only necessary to change the WADL files, which is readily done in well known ways. Each target object operated on by an API has a resource object entity type, and each entity type is defined by metadata. An input map comprising a Java Script Object Notation (JSON) file provides a mapping between a user's (tester's) input parameters and a resource object. Changing the input map in mapping rules between input parameters and entity types in the configuration files, changes mappings for each API. For instance, every input map element may have four fields: field name, field type, relation, and parameter or field value. The framework will automatically generate the expected responses based upon the mappings and input parameters. This enables the status and detailed information about all resource objects created by a tester to be recorded and used by the testing framework.

Figure 2:
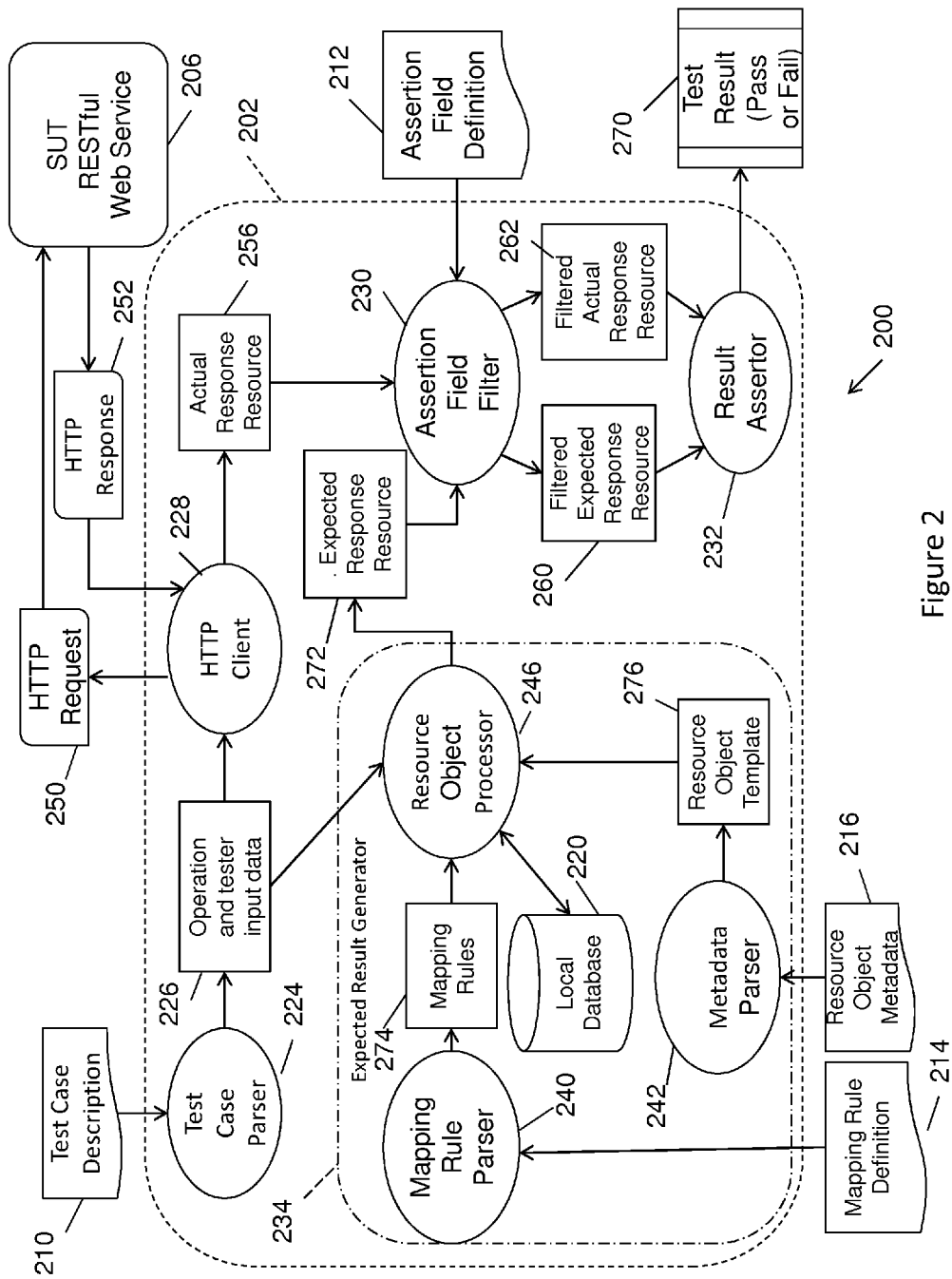
FIG. 2 is a diagrammatic view of the architecture of an intelligent automated testing framework in accordance with the invention for testing a RESTful web service.

FIG. 2 is a diagrammatic view of the architecture of a preferred embodiment of a client system 200 embodying an intelligent automated generalized testing framework 202 in accordance with the invention for testing a RESTful web service 206. The testing framework 202 may receive inputs from four JSON configuration files: a test case description file 210, an assertions field definition file 212, a mapping rule definition file 214, and a resource metadata file 216. These configuration files that establish the test scenarios, parameters, operations and API mappings for the tests that are performed. Preferably the files are constructed using standard xml statements. As will be described, the testing framework of the invention is a generalized testing framework in that it enables tests to be readily changed as desired to test different functionalities or different RESTful web services by changing the configuration text files. This avoids the burden of changing hard coded test cases for different test parameters or servers, as has been necessary previously.

The test case description file 210 may contain a description or specification of one or more test cases to be applied to the RESTful web service system under test (SUT) 206. This is preferable done using WADL to describe the URL, HTTP METHOD and parameters of each HTTP request of each test case. This affords a test case definition schema that allows test case scenarios to be separated from result assertion. Each test case generally comprises one or more steps; and each has at least two component parts. The first component part comprises one or more HTTP requests corresponding to operations of the web service 206; and the second component part comprises the input data to be used by each operation. Each response from the web service will be one or more resource objects, and each resource object may comprise a plurality of different properties, e.g., fields. Normally, for a particular operation not all of the properties are of interest. The assertion field definition file 212 specifies which of the fields are of interest and should be considered, and which can be ignored. The mapping rule definition file 214 is a JSON file that specifies how the input data is to be applied to the resource objects stored in a testing framework local database 220. The resource object metadata file 216 is a JSON file that indicates the properties which a particular resource object has. Since only some of the properties of an actual resource object are of interest, the metadata may be a subset of a property list of an actual response object.

The testing framework may also include a number of different component processes in the form of executable programs comprising executable instructions embodied in physical computer readable media for controlling the client CPU. The component processes may comprise a test case parser 224, an HTTP client 228, an assertion field filter 230, a result assertor 232, and an expected result generator 234. The expected result generator process 234 contains sub-processes, which may include a mapping rule parser 240, a metadata parser 242, and a resource object processor 246.

The test case parser component process 224 receives test case descriptions from test case description text file 210, extracts steps from the test cases, and then extracts operation and tester input data 226 from the extracted steps. This extracted data is provided to both the HTTP client 228 and to the resource object processor 246 of the expected result generator 234. The HTTP client 228 receives the operation and input data from the test case parser and generates corresponding HTTP requests 250 which it sends to the RESTful web service system under test 206. The HTTP client receives actual responses 252 to the requests from the web service 206 and supplies them as actual response resources 256 to the assertion field filter 230.

The assertion field filter process 230 performs two principal functions. It uses assertion field definitions from the assertion field definition file 212 to filter out fields that are not of interest in expected and actual response resource objects, and extracts a subset of the fields in response objects that are of interest. The assertion field filter provides filtered expected response resource objects 260 and filtered actual response resource objects 262 to the result assertor process 232. The result assertor process compares the expected and actual response resource objects, and outputs at 270 the test results of the comparison as a pass if the results match or a fail if they do not match.

The expected result generator 234 is a key component of the testing framework 202. It simulates the web service SUT. It uses the web application description language (WADL) that describes RESTful web service test cases and abstracts service processes that are tested preferably by URL, HTTP process and applicable parameters. It automatically creates expected response resource objects 272 for test steps during run time based upon the operation and testing input data 226, mapping rules 274 provided by the mapping rule parser process 240, and a resource object template 276 provided by the metadata parser process 242. The resource object processor 246 of the expected results generator 234 receives the same operation and tester input data as the HTTP client, and uses them to generate expected responses automatically during run time by applying mapping rules to resource object metadata and test step operation and tester input data. The resource object processor further stores resource objects and updates the resource objects that are changed. The generated expected response resource objects 272 from the resource object processor are provided to the assertion field filter 230 and stored in the local database 220. The local database 220 is preferably an in-memory database in the client computer system.

The mapping rules parser process 240 parses the JSON mapping rule definition file 214, extracts mapping rules 274, and provides them to the resource object processor 246. The metadata parser process 242 parses the JSON resource object metadata file 216, and extracts metadata for each kind of resource object to create resource object templates 276. The resource object templates are used by the resource object processor 246 to create resource objects by mapping input data into the resource templates.

The operation data provided by operation and tester input data 226 to the resource object processor and to the HTTP client indicates the kind of operations to be performed on the web service SUT. Operations comprise different parts. A first is a database manipulation, and a second part is manipulation of a keyword of a resource object. In accordance with the REST principles, there are only four possible manipulations: post (create), update, read and delete. For each of the four possible manipulations, the resource object processor may perform the following operations with respect to database records.

For the create operations, the resource object processor will create an empty resource object based upon a resource template 276, and apply mapping rules 274 to the tester input data 226 to set values of the corresponding properties of the resource object. It will store the resource object in the local database 220 with a keyword provided in the input data 226, and produce a corresponding expected response resource object 272.

For the update operation, the resource object processor will get a target resource object from the local database 220 based on a resource object keyword provided in the tester input data 226; update the resource object by apply mapping rules 274 to the tester input data to set values of the corresponding properties of the resource object; and restore the updated resource object into the local database. The updated resource object will comprise the expected response resource object 272.

For the read operation, the resource object processor will get one or more target resource objects from the local database 220 based upon resource object keywords provided in the tester input data 226, and provide the resource objects as expected responses to the expected response resource object 272.

For the delete operation, the resource object processor will delete a target resource object of the local database 220 based upon a keyword provided in the tester input data 226; generate a response to indicate whether the delete operation succeeded, and provide the response as the expected result to the expected response resource object 272. As previously noted, the local database 220 may comprise in-memory local storage for storing, among other things, data, the various control programs (processes) of the testing framework 202, and the various resources generated by the resource object processor.

As an example, consider the following test case that has two steps. It creates a new user name "julia", and changes Julia's password from "123" to "111". When the test case is run, the testing framework will do the following. In the first test step (Test Step 1) the test case parser 224 will parse the test case for the operation and input data; and in the second step (Test Step 2) it will extract two instances of operations (manipulations) and input data:

| Test Set 1: | | |
|---|---|---|
| Operation | Manipulation | Create |
| | Resource object keyword | julia@@User |
| Tester Input Data | Field | Value |
| | Id: | julia |
| | First Name: | Julia |
| | Last Name: | Li |
| | Password: | 123 |
| | Company: | ABC |
| | Email address: | ye.li@abc.com |

| Test Step 2: | | |
|---|---|---|
| Operation | Manipulation | Update |
| | Resource object keyword | julia@@User |
| Tester Input Data | | New password: 111 |

The test case parser 224 will send the results of Test Step 1 to the expected result generator 234 and to the HTTP client 228. The HTTP client will generate an HTTP request 250 to create a user on the RESTful Web service SUT 206, send the request to the SUT, and received a response 252 to the request from the SUT. The HTTP client will parse the actual response resource object 256 from the response 252 and pass it to the assertion field filter 230. The assertion field filter will parse the actual response resource object 256 to extract the fields of interest, i.e., the "id" and "email" fields, and pass the filtered actual response resource object 262 to the results assertor 232.

Simultaneously with these foregoing steps, the resource object processor 246 will create an empty user resource object based upon a template 276 provided by the metadata parser 242, and apply mapping rules 274 from mapping rules parser 242 to the operation and tester input data 226 to set values for the corresponding fields of the empty resource object. The "id", "first name", "last name", "password", "company", "email", etc., values may be input into the empty resource object. Next, the resource object processor 246 stores the newly created resource object in the local database 220, and also passes the newly created resource object to the assertion field filter 230 as an expected response resource object 272. The assertion filter filters out fields that are not of interest from the expected response resource object, and passes the filtered expected response resource object 260 to the results assertor 232. In the present example the "id" and "email" fields are of interest and are retained in the filtered response resource object passed to the results assertor. The other fields are not of interest and are removed by the assertion field filter.

Next, the results assertor 232 compares the filtered expected and actual response resource objects 260, 262 to determine whether they match. If they do not match, the test case fails and the failure is indicated at 270. Otherwise, if the expected and actual response resource objects match, a pass indication is supplied at 270 and the testing process continues to a Test Step 2 to complete the testing.

In Test Step 2, the testing framework performs a new series of actions to update Julia's password. The HTTP client 228 composes an HTTP request 250 to reset the password of the user "Julia" on the RESTful web service SUT 206, sends the request to the SUT, and receives an HTTP response 252 to the request. The HTTP client passes the received response as an actual response resource object 256 to the assertion field filter 230. The assertion field filter filters the actual response resource object remove all fields except the "id" and "password" fields. The resource object processor 246 retrieves the stored user resource object from the local database using the keyword "julia @@User", updates (changes) the password field of the "julia" resource stores the updated resource back into the local database to overwrite the previously stored one, and also passes the newly created resource object to the assertion field filter 230 as an expected response resource object 272. As described above, the result assertor compares the expected response resource object and the actual response resource object, and provides the result of the comparison as test results at 270.

As will be appreciated from the foregoing example, test cases having any numbers of test steps comprising operations and parameters may be authored in WADL, and descriptions of the test cases stored as text files in the test case description file 210. As will be further appreciated, test case descriptions may be easily edited and changed by changing the WADL file and the test case description file of operations and parameters, and updating or changing the JSON resource object metadata and mapping rules definition configuration files. Accordingly, the invention advantageously permits a large number and variety of different tests to be constructed easily to test different aspects of a RESTful web service and different RESTful web services without the necessity of having to predict expected responses to test requests. The testing framework does this automatically during run time. Thus, the testing framework of the invention is a generalized framework that permits use of test cases that previously were not feasible, thereby affording more complete testing of products.

While the foregoing has been with respect to preferred embodiments of the invention, it will be appreciated that changes to these embodiments may be made without departing from the principles of the spirit of the invention, the scope of which is defined by the appended claims.

The invention claimed is:

1. A method of testing a RESTful web service using a testing framework that includes a client, comprising:
   defining a test case that describes a plurality of RESTful operations on a resource object and associated input data in a test case configuration file, the test case configuration file comprising application program interfaces (APIs) corresponding to one or more of said RESTful operations on the resource object, associated input data and mappings of API's to test parameters of said test case, the test case configuration file having an alias reference identification of said resource object in place of a real identification that is randomly assigned to the resource object during run time processing of said test case;
   providing the test case configuration file to a client and to an expected result generator comprising a resource object processor, the client automatically generating testing requests to said web service at run time while said test case is processing based upon said APIs, said associated input data of said test case configuration file and upon receiving in response to actual responses to said testing requests received from said web service during said run time processing, said automatically generating comprising dynamically updating during run time said alias reference identification in said test case configuration file with said assigned real identification in response to said actual responses;
   automatically creating by the resource object processor expected results generator, at run time while said test case is processing, expected responses to the testing requests based upon said APIs, said updated alias identification, and said associated input data and parameters of said test case configuration file; and
   comparing said actual received responses with said expected responses.

2. The method of claim 1 further comprising creating said resource object by said resource object processor by mapping input data to a resource object template specified in a resource object metadata file, there being a different resource object template for different resource object types.

3. The method of claim 2, wherein resource objects have a plurality of resource object fields, said resource object fields being defined by metadata in said resource object metadata file, and said mapping comprises applying mapping rules from a mapping rule definition file to define parameters for said resource object fields, and wherein said method further comprises defining a new test case by changing said mappings of APIs to new test parameters of said new test case without changing a test script.

4. The method of claim 3, wherein said mapping rules map APIs to resource objects and map input data to said resource object fields, and wherein said automatically creating expected responses comprises applying an API to said resource object and input data based upon said mapping.

5. The method of claim 3, wherein said test case configuration file comprises a text file, and the method further comprising changing said test case applied to said web service by changing said text file to define said new test case.

6. The method of claim 5, wherein said changing said test case further comprise changing said resource object metadata file and said mapping rule definition file.

7. The method of claim 4, wherein said resource object processor creates said resource object by creating and storing an empty resource object in a memory, and mapping said APIs and input data to said empty resource object.

8. The method of claim 7 further comprising simulating said RESTful web service by said resource object processor, and wherein said automatically creating expected responses comprises applying said test case to said simulated RESTful web service.

9. The method of claim 1, wherein said actual responses and said expected responses respectively comprise actual and expected response objects having a plurality of fields, and wherein said method further comprises filtering out fields that are not of interest from said actual and expected response objects to provide filtered actual and expected response objects, and said comparing comprises comparing said filtered actual and expected response objects.

10. The method of claim 9, wherein said filtering comprises applying to said filtering an assertion field definition that defines fields of interest in said actual and expected response objects.

11. A non-transitory computer readable medium embodying executable instructions for controlling the operation of a computer to provide a testing framework to test a RESTful web service, the instructions controlling the computer to perform operations comprising:

defining a test case that describes a plurality of RESTful operations on a resource object and associated input data in a test case configuration file, the test case configuration file comprising application program interfaces (APIs) corresponding to one or more of said RESTful operations on the resource object, associated input data and mappings of API's to test parameters of said test case and associated input data, the test case configuration file having an alias reference identification of said resource object in place of a real identification that is randomly assigned to the resource object during run time processing of said test case;

providing the test case configuration file to a client and to an expected result generator comprising a resource object processor, the client automatically generating testing requests to said web service at run time while said test case is processing based upon said APIs, said associated input data of said test case configuration file and upon receiving in response to actual responses to said testing requests received from said web service during said run time processing, said automatically generating comprising dynamically updating during run time said alias reference identification in said test case configuration file with said assigned real identification in response to said actual responses;

automatically creating by the resource object expected result generator, at run time while said test case is processing, expected responses to the testing requests based upon said APIs, said updated alias identification, and said associated input data and parameters of said test case configuration file; and comparing said actual received responses with said expected responses.

12. The computer readable medium of claim 11 further comprising instructions for creating said resource object by said resource object processor by mapping input data to a resource object template specified in a resource object metadata file, there being a different resource object template for different resource object types.

13. The computer readable medium of claim 12, wherein resource objects have a plurality of resource object fields, said resource object fields being defined by metadata in said resource object metadata file, and said mapping comprises applying mapping rules from a mapping rule definition file to define parameters for said resource object fields, and wherein the method further comprises defining a new test case by changing said mappings of APIs to new test parameters of said new test case without changing a test script.

14. The computer readable medium of claim 13, wherein said mapping rules map APIs to resource objects and map input data to said resource object fields, and wherein said automatically creating expected responses comprises applying an API to said resource object and input data based upon said mapping.

15. The computer readable medium of claim 13, wherein said test case configuration file comprises a text file, and the method further comprising changing said test case applied to said web service by changing said text file to define said new test case.

16. The computer readable media of claim 15, wherein changing said test case further comprises changing said resource object metadata file and said mapping rule definition file.

17. The computer readable medium of claim 14, wherein said resource object processor creates said resource object by creating and storing an empty resource object in a memory, and mapping said APIs and input data to said empty resource object.

18. The computer readable medium of claim 17 further comprising simulating said RESTful web service by said resource object processor, and wherein said automatically creating expected responses comprises applying said test case to said simulated RESTful web service.

19. The computer readable medium of claim 11, wherein said actual responses and said expected responses respectively comprise actual and expected response objects having a plurality of fields, and wherein said method further comprises filtering out fields that are not of interest from said actual and expected response objects to provide filtered actual and expected response objects, and said comparing comprises comparing said filtered actual and expected response objects.

20. The computer readable medium of claim 19, wherein said filtering comprises applying to said filtering an assertion field definition that defines fields of interest in said actual and expected response objects.

* * * * *